(12) United States Patent
Chuang et al.

(10) Patent No.: US 9,990,739 B1
(45) Date of Patent: Jun. 5, 2018

(54) METHOD AND DEVICE FOR FISHEYE CAMERA AUTOMATIC CALIBRATION

(71) Applicant: National Chiao Tung University, Hsinchu (TW)

(72) Inventors: Jen-Hui Chuang, Hsinchu (TW); Tien-Lung Chang, New Taipei (TW); Mu-Tien Lu, New Taipei (TW); Yi-Yu Hsieh, Miaoli (TW); Shih-Wei Yang, Taichung (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 0 days. days.

(21) Appl. No.: 15/674,302

(22) Filed: Aug. 10, 2017

(30) Foreign Application Priority Data

Mar. 13, 2017 (TW) .............................. 106108100 A (51) Int. Cl.
*H04N 17/00* (2006.01)
*G06T 7/80* (2017.01)
*H04N 5/232* (2006.01)

(52) U.S. Cl.
CPC ........... *G06T 7/80* (2017.01); *H04N 5/23293* (2013.01)

(58) Field of Classification Search
CPC .............................. H04N 5/23293; G06T 7/80
USPC ...................................................... 348/187
See application file for complete search history.

(56) References Cited

U.S. PATENT DOCUMENTS

| 6,005,894 | A  | * | 12/1999 | Kumar ..................... H03C 5/00 |
|           |    |   |         | 329/357                              |
| 2003/0142203 | A1 | * | 7/2003 | Kawakami ............ G06T 3/0062 |
|           |    |   |         | 348/36                               |
| 2005/0012745 | A1 | * | 1/2005 | Kondo .................. G06T 3/0062 |
|           |    |   |         | 345/427                              |
| 2009/0110329 | A1 | * | 4/2009 | Lin ......................... G06T 5/006 |
|           |    |   |         | 382/293                              |

FOREIGN PATENT DOCUMENTS

| TW | 519572 B | 2/2003 |
| TW | I339361 B | 2/2003 |
| TW | I383334 B | 1/2013 |

OTHER PUBLICATIONS

Margaret Fleck, "Perspective Projection: The Wrong Imaging Model," technical report 95-01, Computer Science, University of Iowa; 1995; pp. 1-30.

(Continued)

*Primary Examiner* — Michael Lee
(74) *Attorney, Agent, or Firm* — Muncy, Geissler, Olds & Lowe, P.C.

(57) ABSTRACT

A method and device for fisheye camera automatic calibration is disclosed. A first straight line and a second straight line are respectively moved to generate a first fisheye line and a second fisheye line being straight lines. At least two symmetric points are generated on the second straight line based on an intersection of the first straight line and the second straight line as a symmetric central point, so as to correspondingly generate at least two fisheye symmetric points. The second straight line rotates until a distance between the first fisheye line and each of two fisheye symmetric points is equal. Then, central intersection coordinates, fisheye symmetric coordinates, a fisheye symmetric distance are retrieved and used to calculate fisheye parameters.

7 Claims, 6 Drawing Sheets

(56) References Cited

OTHER PUBLICATIONS

Scaramuzza, D. et al., "A Flexible Technique for Accurate Omnidirectional Camera Calibration and Structure from Motion"; Proceedings of IEEE International Conference of Vision Systems (ICVS'06), 2006; pp. 1-8.
Miyamoto, K. "Fish Eye Lens," JOSA, 54: 1060; 1964; pp. 1060-1061.

* cited by examiner

METHOD AND DEVICE FOR FISHEYE CAMERA AUTOMATIC CALIBRATION

This application claims priority for Taiwan patent application no. 106108100 filed on Mar. 13, 2017, the content of which is incorporated by reference in its entirely.

BACKGROUND OF THE INVENTION

Field of the Invention

The present invention relates to a method and device for fisheye camera automatic calibration.

Description of the Related Art

A wide-angle lens is also called a fisheye lens. Since the field of view (FOV) of a fisheye lens is large and can capture an image with larger range, the fisheye lens can be widely applied to various fields, such as security surveillance, photography, computer vision, optical detection, medical endoscope imaging, forest ecology, and astronomy. However, the image captured from the fisheye lens is distorted and deformed. Thus, if the information of the fisheye image is used for appreciation and measurement, the fisheye image needs to be rectified into an image that humans are used to seeing. Presently, there are two calibration methods for a fisheye camera. One calibration method is to capture calibration templates having multiple specific patterns to generate calibration board images, thereby detecting characteristic points of the calibration board images. Then, distortions of positions of the calibration board images and the calibration templates are used to estimate an image center and parameters of a projection function. This method has an advantage of simple hardware arrangement. After capturing sufficient images, the software uses computer vision and numerical methods to perform most of the work. However, the disadvantage of this method is in assigning a type of the projection function and determining the parameter values of the function in advance. In a real case, different types and complexity of functions need to be repeatedly tested. After many calculations, the result with a smaller error is chosen as a given parameter. When the image captured via the lens causes difficulty in being expressed by a simple function with a finite amount of parameters, the projection function obtained by this method is distinct from a real case.

Another calibration method is to use precise instruments to determine positions and angles of the camera and the calibration templates in three-dimensional (3D) space. Then, reference points of pattern features of the calibration templates in the images captured by the camera via the lens are retrieved to calculate the projection function. Alternatively, a mapping table of incident light and imaging points is established. A Taiwan patent No. I339361 uses this method to calculate calibration parameters. This method is not only adaptive to the more complicated projection function but also directly measures the image center to decrease the amount of error of image detection. Nevertheless, the precision of hardware arrangement directly affects calibration results. As a result, this method requires more expensive instruments and more complicated artificially-adjusting processes.

To overcome the abovementioned problems of the prior art and more, the present invention provides a method and device for fisheye camera automatic calibration.

SUMMARY OF THE INVENTION

A primary objective of the present invention is to provide a method and device for fisheye camera automatic calibration, which reduces the operation difficulties and directly captures a real image to automatically generate calibration parameters of a fisheye image with high precision, whereby the fisheye image is automatically turned into the real image without distortion according to fisheye parameters.

Another objective of the present invention is to provide a method and device for fisheye camera automatic calibration, which uses a simple display device and a camera device to replace expensive mechanical equipment with high precision, thereby reducing the calibration cost.

To achieve the abovementioned objectives, the present invention provides a device for fisheye camera automatic calibration, which comprises a control device electrically connected with a fisheye camera device and a display device. The control device controls a real image displayed by the display device, retrieves parameters generated by the fisheye camera device and uses the parameters to calibrate a fisheye image.

The present invention provides a method for fisheye camera automatic calibration, which comprises: a display device generating a real image, and the real image displays a first straight line; a fisheye camera device capturing the real image to generate and display a fisheye image, and the fisheye image comprises a first fisheye line corresponding to the first straight line; moving the first straight line of the real image to turn the first fisheye line displayed by the fisheye camera device into a straight line; generating a second straight line in the real image, and the second straight line intersects the first straight line, and the fisheye camera device generates a second fisheye line in the fisheye image according to the second straight line; moving the second straight line of the real image to turn the second fisheye line displayed by the fisheye camera device into a straight line, thereby retrieving an intersection of the first fisheye line and the second fisheye line used as a central intersection; displaying at least two symmetric points that are symmetric on the second straight line based on an intersection of the first straight line and the second straight line as a symmetric central point, and the fisheye camera device generates at least two fisheye symmetric points according to the at least two symmetric points; rotating the second straight line until a distance between the first fisheye line and each of two fisheye symmetric points displayed by the fisheye camera device is equal; and retrieving central intersection coordinates of the central intersection in the fisheye image, fisheye symmetric coordinates of the at least two fisheye symmetric points and a fisheye symmetric distance between at least one the fisheye symmetric point and the first fisheye line, incorporating the central intersection coordinates, the fisheye symmetric coordinates and the fisheye symmetric distance into fisheye parameter formulas to calculate fisheye parameters, and calibrating the fisheye image according to the fisheye parameters and the central intersection coordinates.

The fisheye parameter formulas are expressed by:

$$x_u = x_d(1 + k_1 r_d^2 + k_2 r_d^4); \text{ and}$$

$$y_u = y_d(1 + k_1 r_d^2 + k_2 r_d^4);$$

wherein $x_u$ is a coordinate of the central intersection coordinates in the X axis; $y_u$ is a coordinate of the central intersection coordinates in the Y axis; $x_d$ is a coordinate of the fisheye symmetric coordinates in the X axis; $y_d$ is a coordinate of the fisheye symmetric coordinates in the Y axis; $r_d$ is the fisheye symmetric distance; $k_1$ and $k_2$ are the fisheye parameters.

Below, the embodiments are described in detail in cooperation with the drawings to make easily understood the technical contents, characteristics and accomplishments of the present invention.

DETAILED DESCRIPTION OF THE INVENTION

Figure 1:
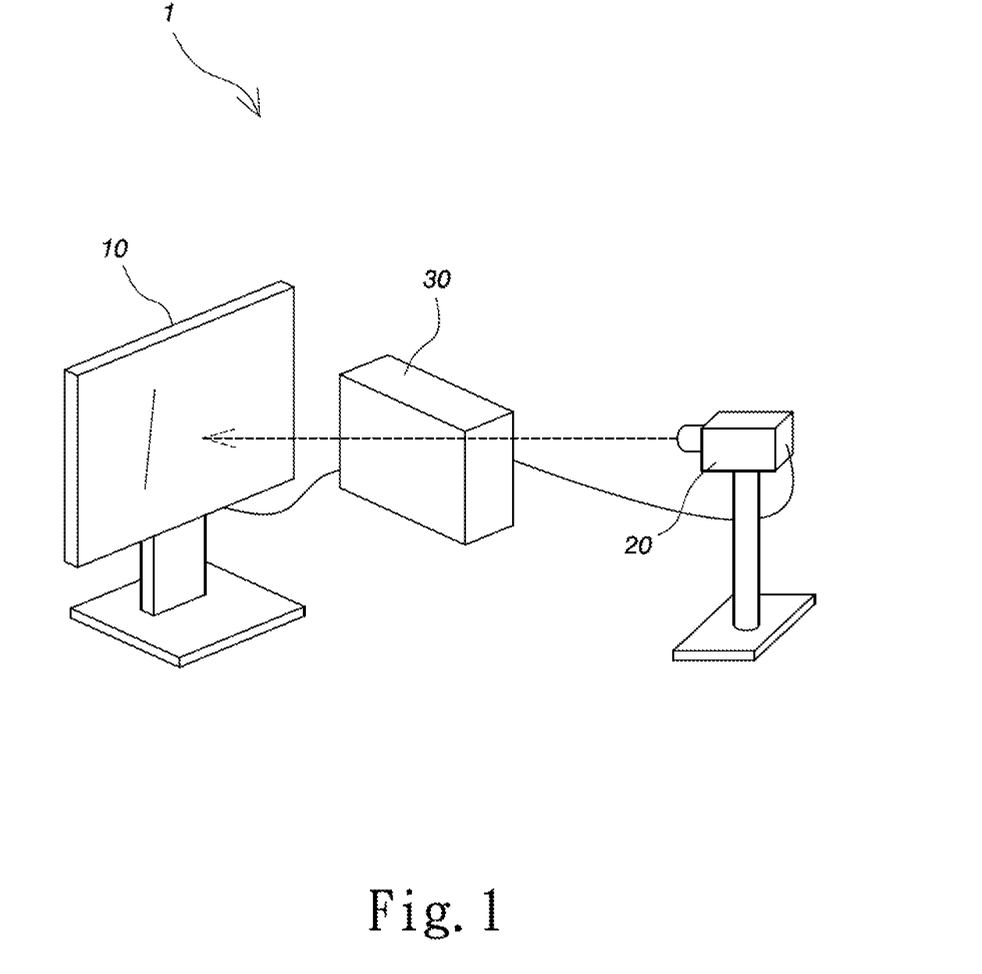
FIG. 1 is a perspective view of a device for generating fisheye calibration parameters according to an embodiment of the present invention.
Figure 2:
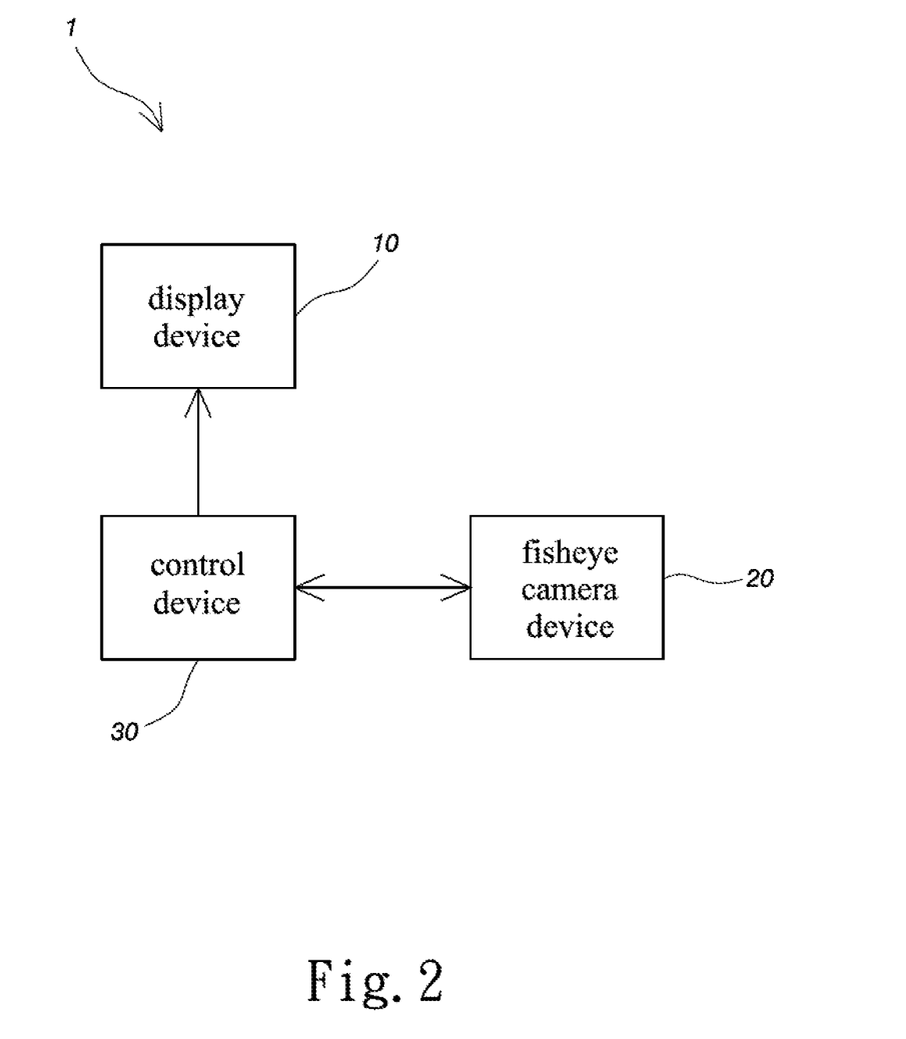
FIG. 2 is a block diagram schematically showing a device for generating fisheye calibration parameters according to an embodiment of the present invention.
Figure 3:
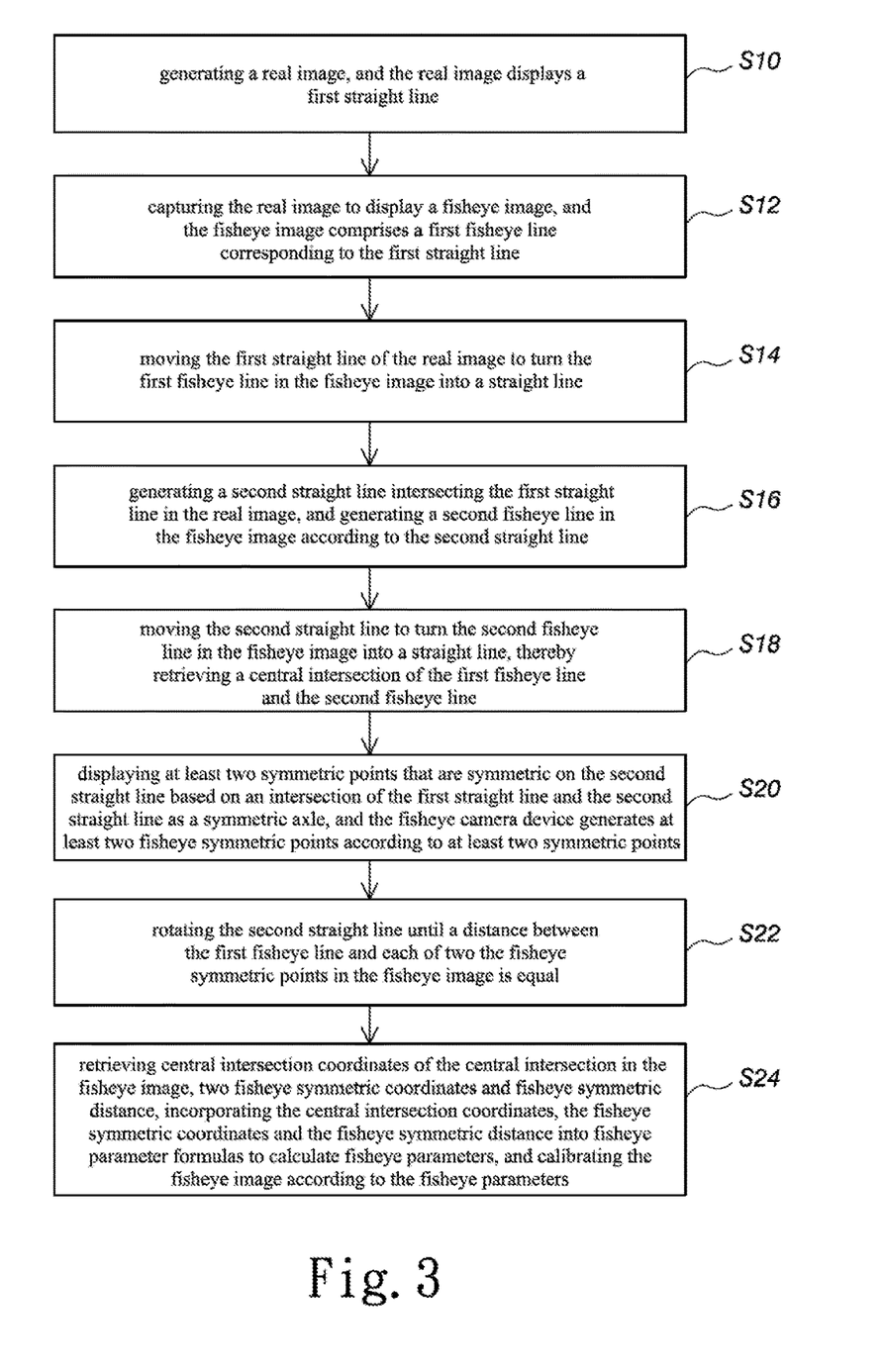
FIG. 3 is a flowchart showing a method for generating fisheye calibration parameters according to another embodiment of the present invention.

Refer to FIG. 1 and FIG. 2 to describe the device of the present invention. The automatic calibration device 1 for a fisheye camera of the present invention comprises a display device 10 generating a real image; a fisheye camera device 20 with a lens aiming at the display device 10 to capture the real image displayed by the display device 10 in order to generate a fisheye image; and a control device 30 realized with a calculator or a processor, such as a central processing unit (CPU), a digital signal processor (DSP) or a microprocessor control unit (MCU). The display device 10 and the fisheye camera device 20 comprise hardware. For example, the display device 10 and the fisheye camera device 20 are respectively a display and a fisheye camera. The control device 30 is electrically connected with the display device 10 and the fisheye camera device 20 to control the display device 10 to display the real image and retrieve the parameters generated by the fisheye camera device 20.

Figure 4:
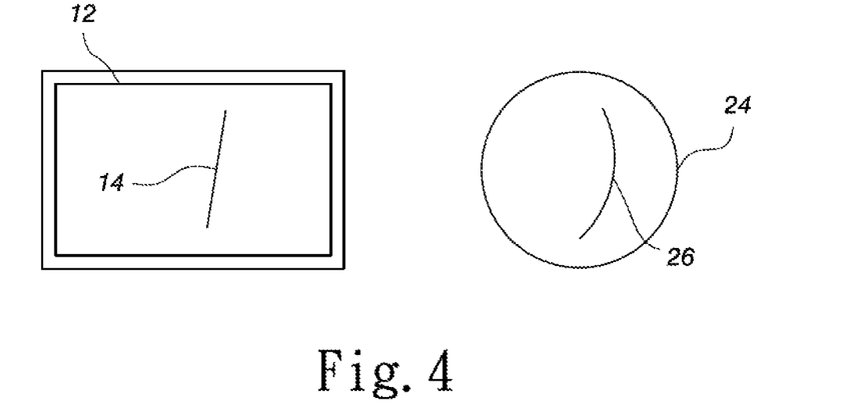
FIGS. 4-8 are diagrams schematically showing continuous states of operating a device for generating fisheye calibration parameters according to an embodiment of the present invention.
Figure 5:
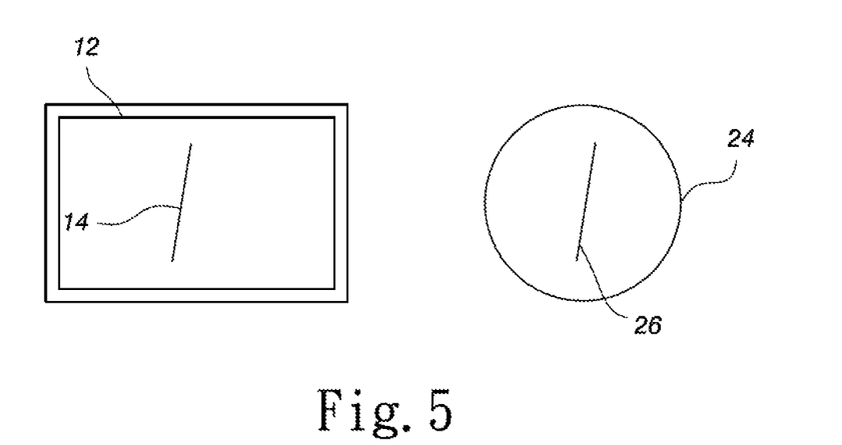

The following details the automatic calibration method for a fisheye camera. Refer to FIGS. 1-8 describing the flowchart of the method of the present invention. Refer to FIG. 4. In Step S10, the control device 30 controls the display device 10 to display a real image 12, wherein the real image 12 displays a first straight line 14. Then, in FIG. 4 and Step S12, the fisheye camera device 20 captures the real image 12 displayed by the display device 10 to generate a fisheye image 24. The fisheye image 24 comprises a distorted first fisheye line 26 corresponding to the first straight line 14. The fisheye image 24 is a virtual image operated by the control device 30 but not displayed by the display. However, in order to clearly describe the embodiment, the present invention shows a virtual fisheye image 24 for explanation. Then, in FIG. 5 and Step S14, the control device 30 horizontally moves the first straight line 14 of the real image 12 displayed by the display device 10 to turn the first fisheye line 26 of the fisheye image 24 into a straight line. Since the fisheye image 24 is distorted, the straight line of the fisheye image 24 is distorted. It is noted that the middle of the fisheye image 24 is not distorted. When the first fisheye line 26 of the fisheye image 24 is a straight line, the first fisheye line 26 is located at the middle position of the fisheye image 24. As a result, the present invention moves the first straight line 14 of the real image 12, so that the first fisheye line 26 is located at the middle position of the fisheye image 24, thereby obtaining the coordinates of the middle position of the fisheye image 24.

Figure 6:
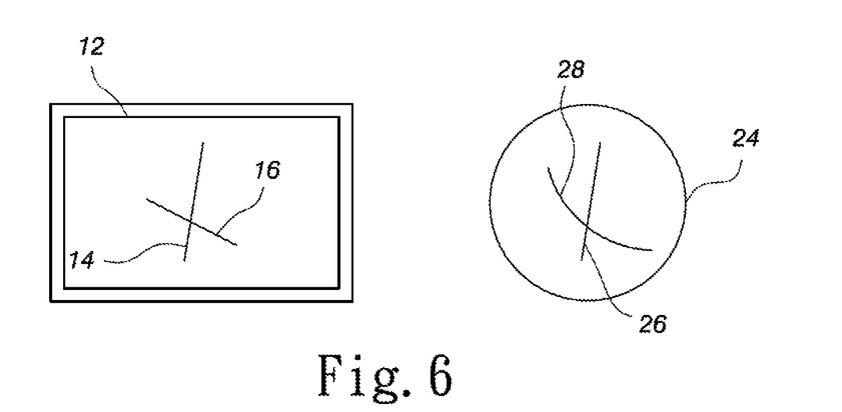
Figure 7:
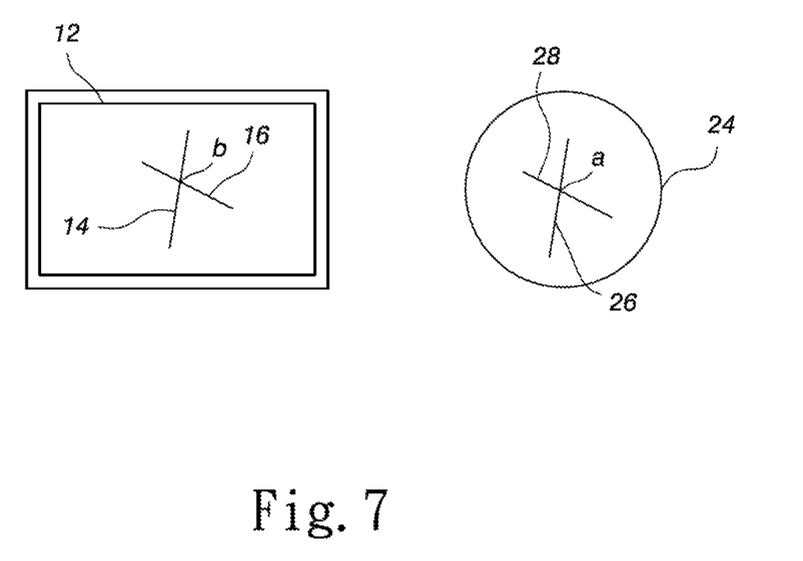

After the first fisheye line 26 is moved to the middle of the fisheye image 24, the process proceeds to Step S16. Refer to FIG. 6. The control device 30 controls the display device 10 to generate a second straight line 16 in the real image 12, wherein the second straight line 16 intersects the first straight line 14. For example, the second straight line 16 is perpendicular to the first straight line 14, but the present invention is not limited thereto. The first straight line 14 intersects the second straight line 16 to form an intersection. Simultaneously, the fisheye camera device 20 uses the second straight line 16 to generate a second fisheye line 28 intersecting the first fisheye line 26 in the fisheye image 24. Then, in Step S18 and FIG. 7, the control device 30 vertically moves the second straight line 16 in the real image 12, so as to turn the second fisheye line 28 of the fisheye image 24 into a straight line. According to the abovementioned reason, the middle of the fisheye image 24 is not distorted. When the second fisheye line 28 of the fisheye image 24 is a straight line, the second fisheye line 28 is located at the middle position of the fisheye image 24. Thus, the intersection of the first fisheye line 26 and the second fisheye line 28 is a center of the fisheye image 24. The intersection of the first fisheye line 26 and the second fisheye line 28 is retrieved as a central intersection a.

Figure 8:
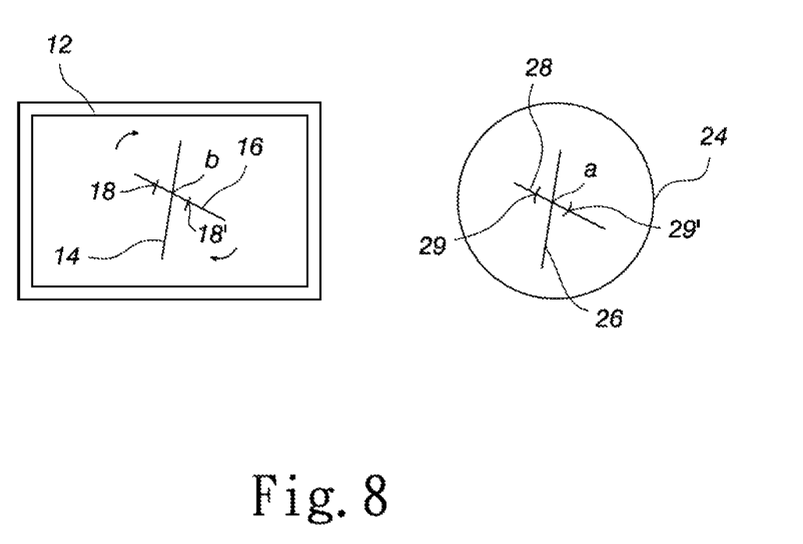

Refer to FIG. 8. In Step S20, the control device 30 controls the display device 10 to display at least two symmetric points 18 and 18' that are symmetric on the second straight line 16 based on an intersection b of the first straight line 14 and the second straight line 16 as a symmetric central point in the real image 12. Since the symmetric points 18 and 18' are symmetric with respect to the symmetric central point, a distance between the symmetric point 18 and the intersection b is equal to a distance between the symmetric point 18' and the intersection b. Meanwhile, the fisheye camera device 20 generates two fisheye symmetric points 29 and 29' in the fisheye image 24 according to the symmetric points 18 and 18'. Next, refer to FIG. 8. In Step S22, using the intersection b of the first straight line 14 and the second straight line 16 being an axle center, the control device 30 rotates the second straight line 16 having the symmetric points 18 and 18' thereon to adjust the positions of the fisheye symmetric points 29 and 29' in the fisheye image 24, until a fisheye symmetric distance between the fisheye symmetric point 29 and the first fisheye line 26 is equal to a fisheye symmetric distance between the fisheye symmetric point 29' and the first fisheye line 26. Finally, the process proceeds to Step S24. In Step S24, the control device 30 retrieves central intersection coordinates of the central intersection of the first fisheye line 26 and the second fisheye line 28 in the fisheye image 24, two fisheye symmetric coordinates of the fisheye symmetric points 29 and 29' and fisheye symmetric distance between the first fisheye line 26 and each of the fisheye symmetric points 29 and 29', and incorporates the central intersection coordinates, the fisheye symmetric coordinates and the fisheye symmetric distance into fisheye parameter formulas. Since the embodiment exemplifies two fisheye symmetric points, two fisheye parameter formulas are generated and used to calculate fisheye parameters. The fisheye parameter formulas are expressed by:

$$x_u = x_d(1 + k_1 r_d^2 + k_2 r_d^4); \text{ and}$$

$$y_u = y_d(1 + k_1 r_d^2 + k_2 r_d^4);$$

wherein $x_u$ is a coordinate of the central intersection coordinates in the X axis; $y_u$ is a coordinate of the central intersection coordinates in the Y axis; $x_d$ is a coordinate of the fisheye symmetric coordinates in the X axis; $y_d$ is a coordinate of the fisheye symmetric coordinates in the Y axis; $r_d$ is the fisheye symmetric distance; $k_1$ and $k_2$ are the fisheye parameters. After calculating the fisheye parameters, the control device 30 records the fisheye parameters and the central intersection coordinates of the fisheye image, and uses the fisheye parameters and the central intersection coordinates of the fisheye image to directly recover the fisheye image and automatically generate a real image without distortion.

Figure 9:
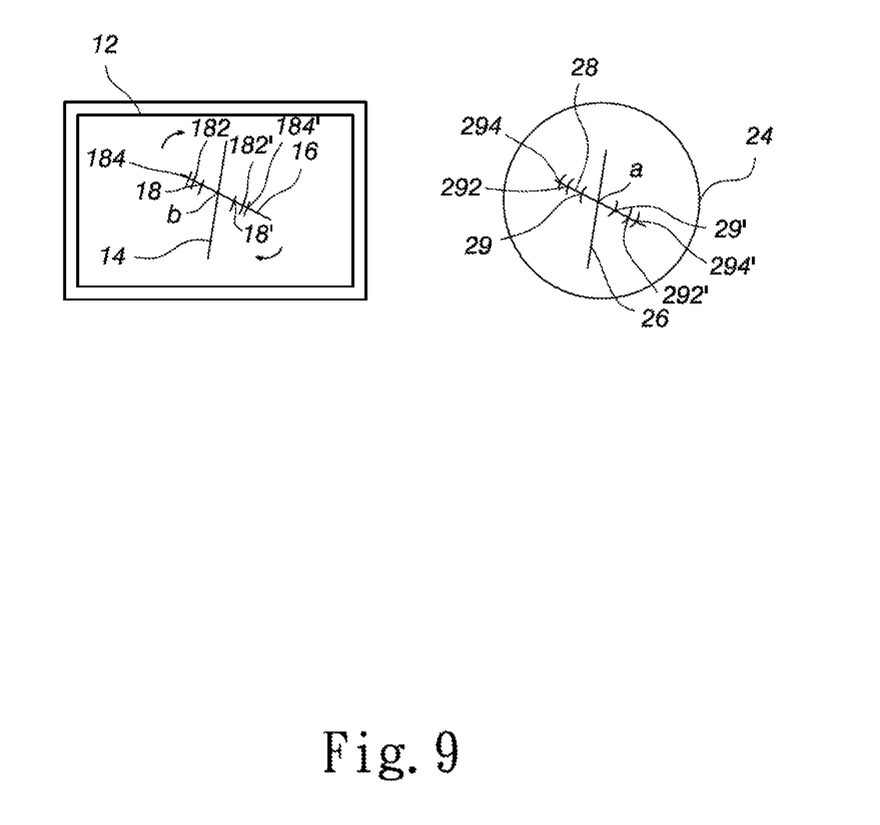
FIG. 9 is a diagram schematically showing a state of operating a device for generating fisheye calibration parameters according to an embodiment of the present invention.

In addition to the abovementioned embodiment, the present invention provides another embodiment. Since the device and Steps S10-S18 used in the two embodiments are identical, the device and Steps S10-S18 used in the embodiment will not be reiterated. Refer to FIG. 9.

The process proceeds to Step S20. The abovementioned embodiment displays two symmetric points that are symmetric on the second straight line 16 in the real image 12, and in addition to that the control device 30 displays a plurality of symmetric points 18, 182, 184, 18', 182' and 184' on the second straight line 16 in the real image 12. The symmetric point 18 is symmetric to the symmetric point 18'. The symmetric point 182 is symmetric to the symmetric point 182'. The symmetric point 184 is symmetric to the symmetric point 184'. The distances among the symmetric points 18, 182, 184, 18', 182' and 184' are equal or unequal. A distance between the first straight line 14 and each of the symmetric points 18 and 18' is equal, and a distance between the first straight line 14 and each of the symmetric points 182 and 182' is equal, and a distance between the first straight line 14 and each of the symmetric points 184 and 184' is equal. In Step S22, the control device 30 rotates the second straight line 16 in the real image 12 with the intersection b being an axle center, so as to adjust the positions of the symmetric points 18, 182, 184, 18', 182' and 184', whereby a distance between the first fisheye line 26 and each of the fisheye symmetric points 29 and 29' displayed by the fisheye camera device 20 is equal. A distance between the fisheye symmetric point 292 and the first fisheye line 26 is equal to a distance between the fisheye symmetric point 292' and the first fisheye line 26, and a distance between the fisheye symmetric point 294 and the first fisheye line 26 is equal to a distance between the fisheye symmetric point 294' and the first fisheye line 26. Finally, in Step S24, the control device 30 retrieves central intersection coordinates of the central intersection a of the first fisheye line 26 and the second fisheye line 28 in the fisheye image 24, fisheye symmetric coordinates of the fisheye symmetric points 29, 292, 294, 29', 292' and 294' and a fisheye symmetric distances between the first fisheye line 26 and each of the fisheye symmetric points 29, 292, 294, 29', 292' and 294', and incorporates the central intersection coordinates, the fisheye symmetric coordinates and the fisheye symmetric distance into fisheye parameter formulas. Since the embodiment exemplifies a plurality of fisheye symmetric points, a plurality of fisheye parameter formulas is generated and used to calculate fisheye parameters. On top of that, a plurality of fisheye parameter formulas is used to improve the precision of the fisheye parameters. After calculating the fisheye parameters, the control device 30 records the fisheye parameters and the central intersection coordinates of the fisheye image, and uses the fisheye parameters and the central intersection coordinates of the fisheye image to directly recover the fisheye image and automatically generate a real image without distortion.

In conclusion, the present invention retrieves the real image to automatically figure out the calibration parameters of the fisheye image, whereby the fisheye image is automatically turned into a real image without distortion according to the fisheye parameters. The present invention directly uses the real image to perform a calibration process to reduce the operation difficulties and improve the precision of the fisheye calibration parameters. Additionally, the present invention has a simple structure to replace expensive mechanical equipment with high precision, thereby reducing the calibration cost.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A method for fisheye camera automatic calibration comprising:

generating a real image by a display device, wherein said real image displays a first straight line;

capturing said real image by a fisheye camera device to generate and display a fisheye image, wherein said fisheye image comprises a first fisheye line corresponding to said first straight line;

moving said first straight line of said real image to turn said first fisheye line displayed by said fisheye camera device into a straight line;

generating a second straight line in said real image, wherein said second straight line intersects said first straight line, and generating a second fisheye line by said fisheye camera device in said fisheye image according to said second straight line;

moving said second straight line of said real image to turn said second fisheye line displayed by said fisheye camera device into a straight line, thereby retrieving an intersection of said first fisheye line and said second fisheye line used as a central intersection;

displaying at least two symmetric points that are symmetric on said second straight line based on an intersection of said first straight line and said second straight line as a symmetric central point, and generating at least two fisheye symmetric points by said fisheye camera device according to said at least two symmetric points;

rotating said second straight line until a distance between said first fisheye line and each of two said fisheye symmetric points displayed by said fisheye camera device is equal; and retrieving central intersection coordinates of said central intersection in said fisheye image, fisheye symmetric coordinates of said at least two fisheye symmetric points and a fisheye symmetric distance between at least one said fisheye symmetric point and said first fisheye line, incorporating said central intersection coordinates, said fisheye symmetric coordinates and said fisheye symmetric distance into fisheye parameter formulas to calculate fisheye parameters, and calibrating said fisheye image according to said fisheye parameters and said central intersection coordinates.

2. The method for fisheye camera automatic calibration according to claim 1, wherein said fisheye parameter formulas are expressed by:

$$x_u = x_d(1 + k_1 r_d^2 + k_2 r_d^4); \text{ and}$$

$$y_u = y_d(1 + k_1 r_d^2 + k_2 r_d^4);$$

wherein $x_u$ is a coordinate of said central intersection coordinates in a X axis; $y_u$ is a coordinate of said central intersection coordinates in a Y axis; $x_d$ is a coordinate of said fisheye symmetric coordinates in a X axis; $y_d$ is a coordinate of said fisheye symmetric coordinates in a Y axis; $r_d$ is said fisheye symmetric distance; $k_1$ and $k_2$ are said fisheye parameters.

3. The method for fisheye camera automatic calibration according to claim 1, wherein in said step of displaying said at least two symmetric points that are symmetric on said second straight line, a plurality of symmetric points that is symmetric is displayed on said second straight line of said real image.

4. A device for fisheye camera automatic calibration comprising:

a display device displaying a real image;

a fisheye camera device capturing said real image to generate and display a fisheye image; and a control device electrically connected with said display device and said fisheye camera device, and when said control device controls said display device to display a first straight line in said real image, said fisheye camera device displays a first fisheye line corresponding to said first straight line, and said control device moves said first straight line displayed by said display device, so as to turn said first fisheye line displayed by said fisheye camera device into a straight line, and said control device controls said real image to display a second straight line intersecting said first straight line, and after said fisheye camera device generates a second fisheye line in said fisheye image according to said second straight line, said control device moves said second straight line of said real image to turn said second fisheye line displayed by said fisheye camera device into a straight line, thereby retrieving an intersection of said first fisheye line and said second fisheye line used as a central intersection, and said control device displays at least two symmetric points that are symmetric on said second straight line based on an intersection of said first straight line and said second straight line as a symmetric central point, and said fisheye camera device generates at least two fisheye symmetric points according to said at least two symmetric points, and said control device controls said display device to rotate said second straight line until a distance between said first fisheye line and each of two said fisheye symmetric points displayed by said fisheye camera device is equal, and said control device retrieves central intersection coordinates of said central intersection in said fisheye image, fisheye symmetric coordinates of said at least two fisheye symmetric points and a fisheye symmetric distance between at least one said fisheye symmetric point and said first fisheye line, incorporates said central intersection coordinates, said fisheye symmetric coordinates and said fisheye symmetric distance into fisheye parameter formulas to calculate fisheye parameters, and calibrates said fisheye image according to said fisheye parameters and said central intersection coordinates.

5. The device for fisheye camera automatic calibration according to claim 4, wherein said fisheye parameter formula are expressed by:

$$x_u = x_d(1 + k_1 r_d^2 + k_2 r_d^4); \text{ and}$$

$$y_u = y_d(1 + k_1 r_d^2 + k_2 r_d^4);$$

wherein $x_u$ is a coordinate of said central intersection coordinates in a X axis; $y_u$ is a coordinate of said central intersection coordinates in a Y axis; $x_d$ is a coordinate of said fisheye symmetric coordinates in a X axis; $y_d$ is a coordinate of said fisheye symmetric coordinates in a Y axis; $r_d$ is said fisheye symmetric distance; $k_1$ and $k_2$ are said fisheye parameters.

6. The device for fisheye camera automatic calibration according to claim 4, wherein said at least two symmetric points further comprises a plurality of symmetric points.

7. The device for fisheye camera automatic calibration according to claim 4, wherein said control device is a calculator.

* * * * *